May 10, 1949.  R. E. CORNWELL  2,469,632
HYDRAULIC BRAKING MECHANISM
Filed Aug. 13, 1946  4 Sheets-Sheet 3

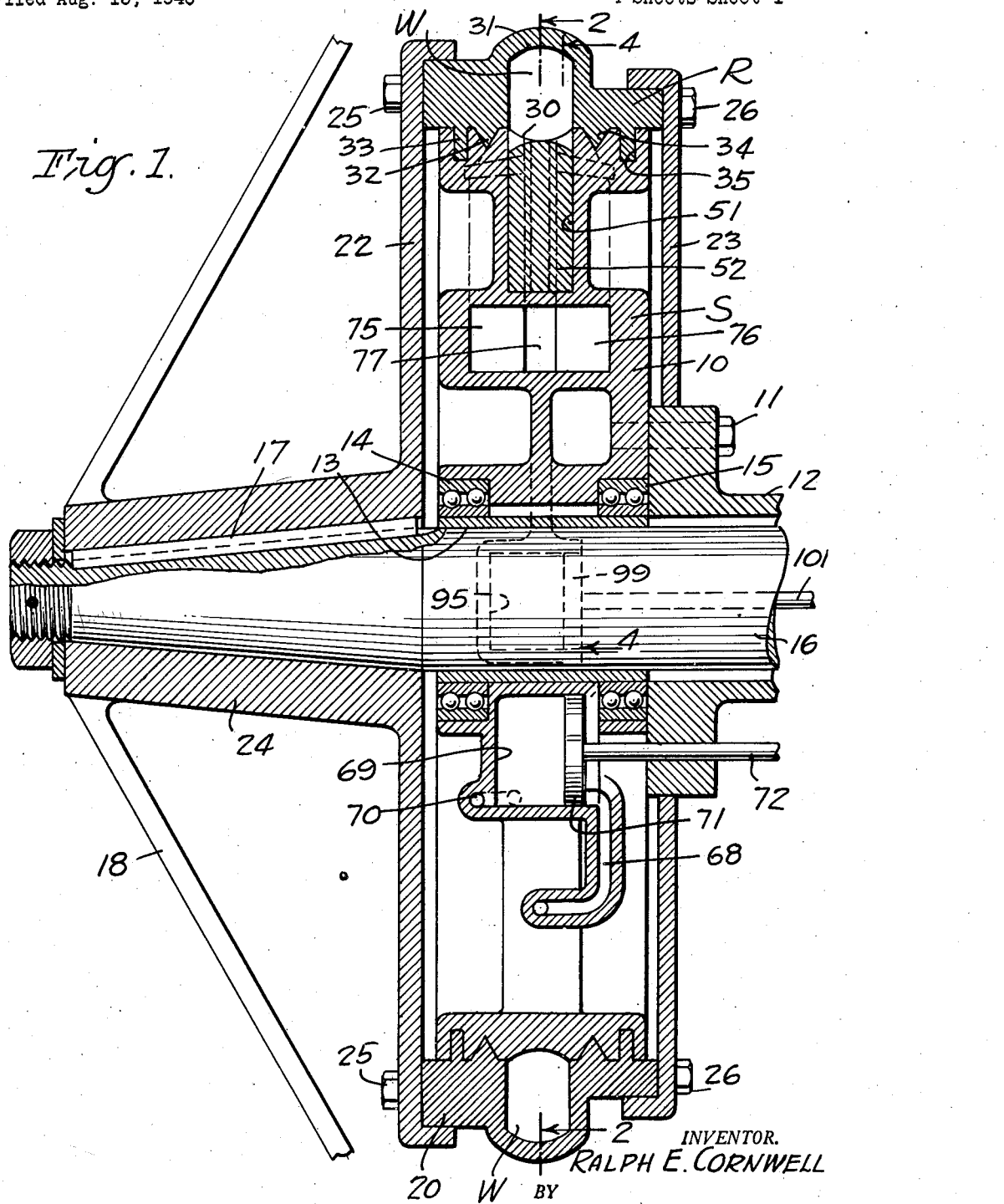

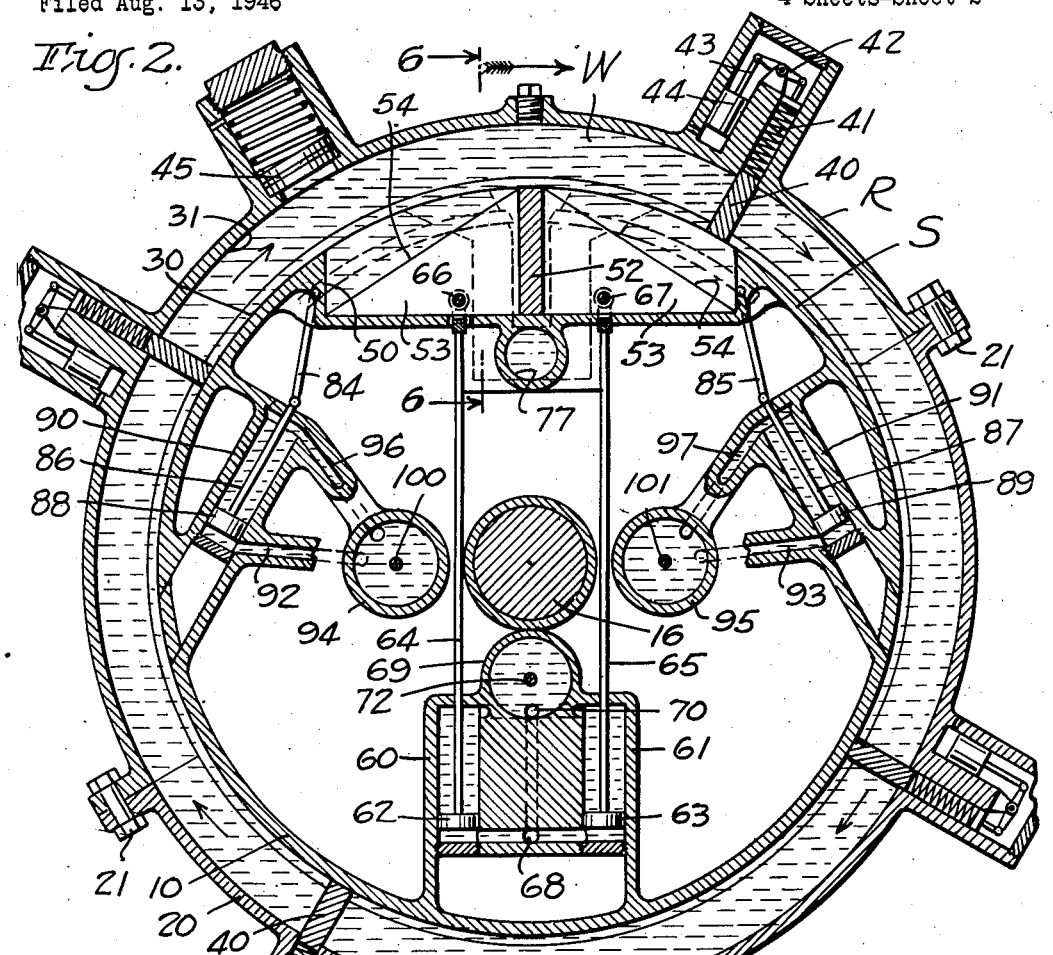

INVENTOR.
RALPH E. CORNWELL
BY
Frederick Diehl
ATTORNEY

May 10, 1949.    R. E. CORNWELL    2,469,632
HYDRAULIC BRAKING MECHANISM
Filed Aug. 13, 1946    4 Sheets-Sheet 4

INVENTOR.
RALPH E. CORNWELL
BY
Frederick Diehl
ATTORNEY

Patented May 10, 1949

2,469,632

UNITED STATES PATENT OFFICE 2,469,632

HYDRAULIC BRAKING MECHANISM

Ralph E. Cornwell, La Canada, Calif.

Application August 13, 1946, Serial No. 690,137

10 Claims. (Cl. 188—90)

This invention relates generally to hydraulic control apparatus, and more particularly to hydraulic braking mechanisms.

An object of this invention is to provide a hydraulic braking mechanism, which, in association with a driven axle or shaft of a vehicle or other form of machine, is structurally characterized by simple, substantial, compact and positively acting means enabling any degree of service or emergency braking action to be easily, smoothly, and accurately applied hydraulically to the rotary driven element, and the latter hydraulically locked against rotation, all by a simple operation of suitable controls.

Another object of this invention is to provide a hydraulic braking mechanism of the above described character, which, in its fully released condition, leaves the rotary driven element free for rotation with but negligible fluid drag, so as to avoid the generation of excessive heat which cannot be readily dissipated, and thus not reduce the mechanical efficiency of the machine.

A further object of this invention is to provide a hydraulic braking mechanism in whose rotor the main body of liquid is held under the action of centrifugal force, in a manner to reduce to a negligible minimum the tendency of any liquid leakage from the system when the machine is running with the brake fully released, so that only when pressure is built up in the system by the braking action, or when the machine is at rest, is the need for a fluid-tight system present.

With these and other objects in view, the invention resides in the combinations, arrangements and functional relationships of elements as set forth in the following specification and particularly pointed out in the appended claims.

In the accompanying drawings,

Figure 1 is a diametric, axial sectional view of one form of hydraulic braking mechanism embodying this invention;

Figure 2 is a transverse sectional view taken on the line 2—2 of Figure 1 and illustrating the positions of the working parts when the brake is fully released;

Figure 3 is a fragmentary sectional view similar to Figure 2, and illustrating the positions of the working parts when the brake is partly applied;

Figure 4:
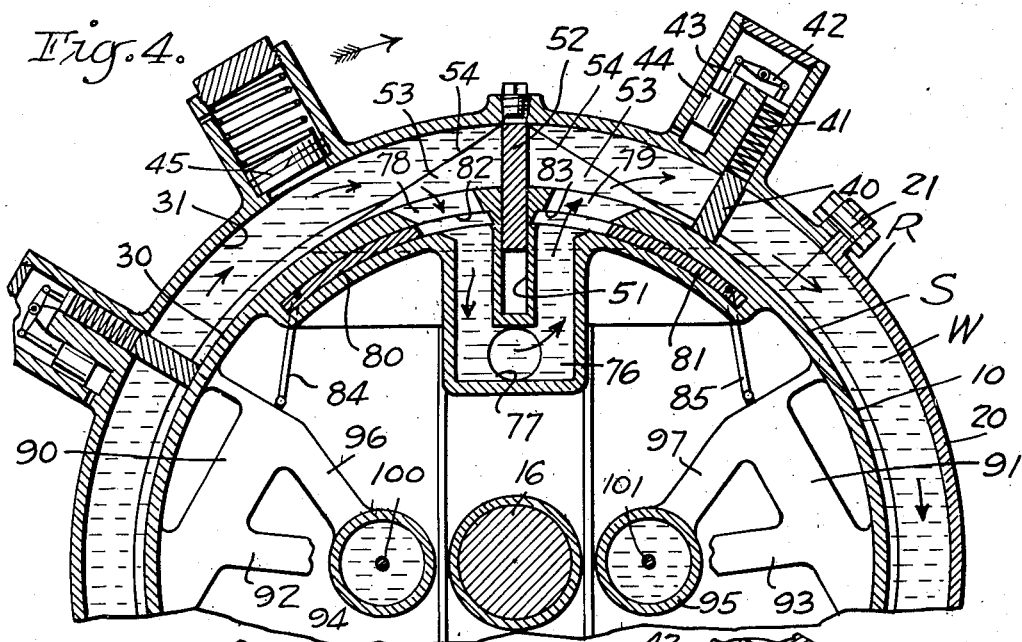
Figure 4 is a transverse sectional view taken on the line 4—4 of Figure 1, and showing the positions of the working parts corresponding to those in Figure 3.

Referring specifically to the drawings, the invention in its illustrated embodiment comprises a stator S and a rotor R, the stator being a generally cylindrical narrow body 10 secured by fastening members 11 to an axle housing 12 or other support capable of rigidly securing the stator against rotation. Extending through the axial bore 13 of the stator and journaled in bearings 14 and 15 in the latter, is a driven shaft or axle 16, which, in the case of an automobile or other vehicle, has fixed to the outer projecting end thereof by a key 17, a wheel 18 of the vehicle including the rotor R.

The rotor R comprises an annular body 20 formed in two halves rigidly secured together by bolts 21. The inside diameter of the rotor body is such as to receive the outside diameter of the stator body 10 with a close fit therebetween. The rotor includes side plates 22 and 23 co-acting with the rotor body 20 to enclose the stator S, the side plate 22 extending from the hub 24 of the wheel 18 and being secured to the rotor body by bolts 25, whereas the side plate 23 is secured to the rotor body by bolts 26 and has a central opening to receive the shaft 16, all as clearly shown in Figure 1.

The stator body 10 has a shallow peripheral annular groove 30, whereas the rotor body 20 has a relatively deep, annular recess 31 co-acting with the groove 30 to define an annular working chamber W for the hydraulic liquid. At opposite sides of the working chamber, the rotor body 20 is provided with annular sealing ribs 32 and 33 of V-shaped and rectangular cross sections, respectively, which have close fits in annular grooves 34 and 35 of complementary cross sections formed in the stator body 10, as also shown in Figure 1, all to the end of sealing the joint between the stator and rotor bodies against leakage of liquid from the working chamber W.

It will also be noted that as the major part of the volume of the working chamber is in the rotor body 20, most of the liquid filling the chamber will be held by centrifugal force in the rotor during rotation thereof, thus reducing to a minimum the tendency for liquid leakage from the system, and limiting any possible leakage to such times as pressure is developed in the system by a brake application or when the wheel is at rest.

At equally spaced locations circumferentially, the rotor is provided with vanes 40 adapted to span the working chamber W, and mounted for reciprocating movement radially of the rotor as shown in Figure 2. In the present instance four vanes 40 are shown and are normally urged by springs 41 to bear against the periphery of the stator body 10, and are operatively connected by rocker levers 42 and links 43 to weights 44, which latter, under the action of centrifugal force, counteract the reverse action of centrifugal force upon the vanes 40 in tending to move the latter away from the stator body against the action of the springs 41, thus insuring a fluid-tight seal at the vanes irrespective of the speed of rotation of the rotor.

The rotor is also provided with a spring-loaded piston 45 exposed to hydraulic pressure in the working chamber W, and adapted to yield to pressure in excess of the predetermined maximum pressure necessary to obtain a full braking application and a hydraulic lock, whereby to obviate "liquid hammer" and surging of liquid in the system.

The stator body 10 is provided with a relatively long and narrow slot 50 opening at the periphery of the body into the working chamber W, and intersected medially between its ends by a transversely extending radial slot 51 also opening at the periphery of the stator into the working chamber. A main valve 52 in the form of a plate, is slidably mounted in the slot 51 and is provided at opposite sides with wings 53 slidable in the slot 50 and having cam surfaces 54.

In the fully closed position of the valve 52 wherein the latter spans the working chamber W radially as shown in Figure 3, the cam surfaces 54 extend from a point of tangency at the periphery of the stator body to the outer end of the valve, as clearly shown in Figure 3, all for coaction of the cam surfaces with the vanes 40 in camming the latter clear of the working chamber against the springs 41, so as to permit rotation of the rotor with the valve 52 maintained in any operating position to fully closed position, as will be later fully described.

In the present instance the valve 52 is adapted to be actuated by a hydraulic actuating unit in the stator, which comprises a pair of cylinders 60, 61 in which work pistons 62, 63 whose rods 64, 65 are connected at 66, 67 to the wings 53 of the valve 52. The cylinders 60, 61 are connected at one end by a passage 68 to one end of a master cylinder 69, and are connected at the other end by a passage 70 to the other end of the master cylinder.

Figure 9:
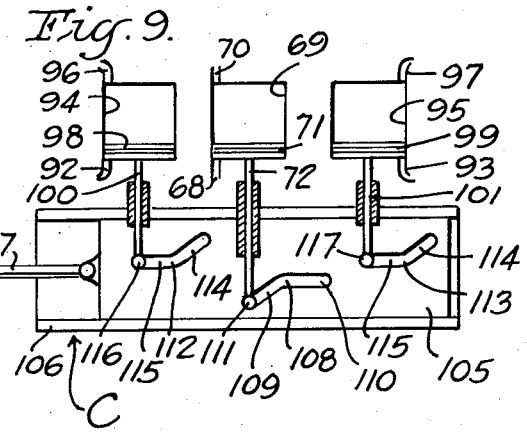
Figure 9 is a semi-diagrammatic view of a control mechanism for the hydraulic valves of the mechanism.

Working in the master cylinder 69 is a piston 71 whose rod 72 is adapted for actuation by a control mechanism designated generally at C (Figure 9). For the present it will suffice to state that actuation of the master piston 71 in one direction will move the valve 52 from the open or non-operating position shown in Figure 2, to the closed or operating position shown in Figure 3, whereas movement of the piston 71 in the opposite direction will effect the reverse movement of the valve, all through the medium of the hydraulic liquid which fills all otherwise unoccupied space in the cylinders 60, 61 and 69, and the passages 68 and 70.

Figure 8:
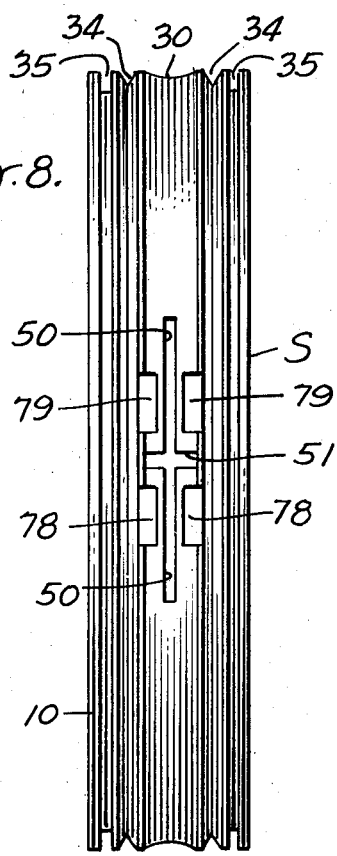
Figure 8 is a view in side elevation, of the rotor of the hydraulic braking mechanism.
Figure 7:
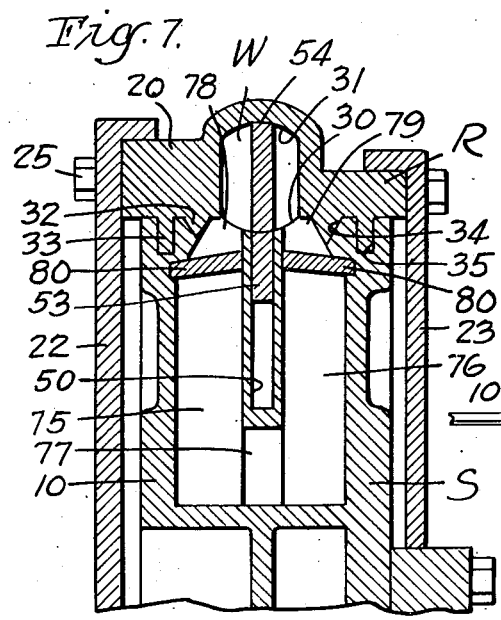
Figure 7 is a fragmentary sectional view taken on the line 7—7 of Figure 5.

The stator body 10 is also provided with two generally U-shaped bypass passages 75 and 76 at opposite sides of the slot 50 and connected by a transverse passage 77. The outer ends of the passages 75 and 76 open at the periphery of the stator body into the working chamber W to form pairs of ports 78 and 79 (Figure 8) at opposite sides of the valve 52, through which liquid in the working chamber W will be forced to pass through the stator around the valve 52 when fully closed, during rotation of the rotor, all as indicated by the arrows in Figure 4.

Figure 5:
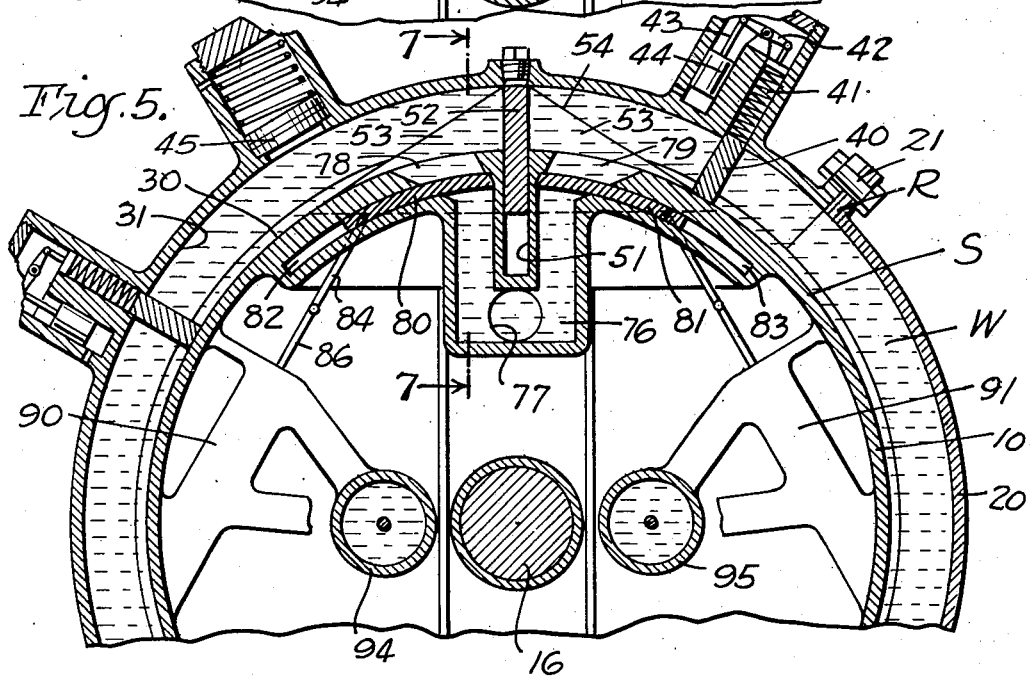
Figure 5 is a view similar to Figure 4 and showing the positions of the working parts when the brake is fully applied to produce a hydraulic lock.
Figure 6:
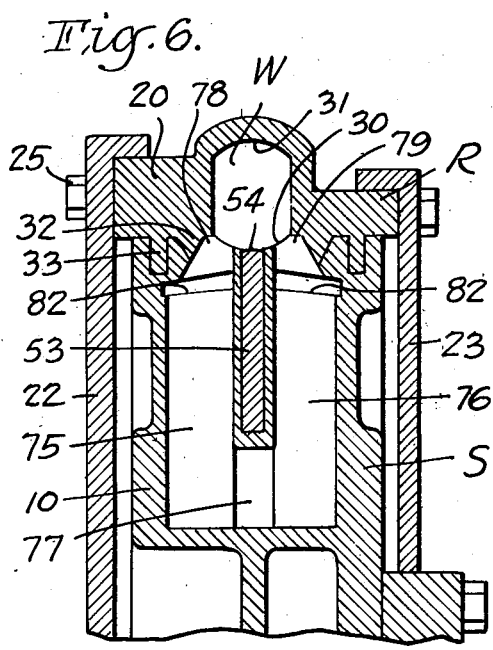
Figure 6 is a fragmentary sectional view taken on the line 6—6 of Figure 2.

In their branches at opposite sides of the valve 52, the bypass passages 75 and 76 are provided with pairs of valves 80, 81 in the form of curved plates slidably mounted in slots 82, 83 in the stator body 10 for movement to occupy open and closed positions with respect to the bypass passages, as shown, respectively, in Figures 4 and 5. The pairs of valves 80, 81 are connected by links 84, 85 to the rods 86, 87 of pistons 88, 89 working in cylinders 90, 91 in the stator body 10.

The cylinders 90, 91 are connected at one end by passages 92, 93 to one of the ends of master cylinders 94, 95, and are connected at their other ends by passages 96, 97 to the other ends of these master cylinders. Working in the respective cylinders 94, 95 are pistons 98, 99 whose rods 100, 101 are adapted for actuation by the control mechanism C above referred to. Actuation of the pistons 98, 99 in unison in one direction will simultaneously move the pairs of bypass valves 80, 81 from the open position shown in Figure 4 to the closed position shown in Figure 5, whereas movement of these pistons in unison in the opposite direction will effect the reverse movement of the valves, all through the medium of the hydraulic liquid which fills all otherwise unoccupied space in the cylinders 90, 94, 91, 95, and in the several passages 92, 96, and 93, 97.

For the purpose of illustration, the control mechanism C comprises a cam plate 105 reciprocably mounted in a guide 106 and adapted to be manually or otherwise actuated by a rod 107. The cam plate 105 is provided with a cam slot 108 having an active portion 109 and a dwell portion 110, in which works a roller 111 carried by the rod 72 of the piston 71. The cam plate 105 is further provided with two identical cam slots 112 and 113 having active portions 114 and dwell portions 115, in which respectively work rollers 116 and 117 carried by the rods 100, 101 of the pistons 98, 99, for synchronized successive actuation of the pistons 71 and 98, 99 in the operation of the invention which is as follows:

In the position of the cam plate 105 shown in Figure 9, the main valve 52 and the bypass valves 80, 81 are fully open, thus permitting unrestricted rotation of the rotor R, as the vanes 40 merely circulate the liquid in the working chamber with but negligible fluid drag.

However, upon moving the cam plate 105 to the left, the piston 71 will first be moved in its cylinder 69 to initiate closing movement of the valve 52 from its fully open or non-operating position, and thus restrict circulation of the liquid in the working chamber W by the vanes 40, which latter ride over the cam surfaces 54 so as to pass the valve 52. This restricted circulation of the liquid forces part thereof through the restricting bypass ports 78, 79, to the end that a braking action upon the rotor will be developed, and will be increased as further closing movement of the valve 52 is effected, until the fully closed position thereof shown in Figure 3 is reached.

Should this brake application, which may be termed a "service" application, be insufficient, continued movement of the cam plate 105 to the left will maintain the valve 52 fully closed, while the pistons 98, 99 will be moved in unison in their respective cylinders 94, 95 to initiate closing movements of the pairs of valves 80, 81, to thus further restrict the flow of liquid through the bypass passages 75, 76, and hence increase the braking action upon the rotor, until in the fully closed positions of the valves 80, 81 shown in Figure 5, all circulation of liquid will cease, to form a hydraulic lock upon the rotor against rotation thereof.

By now moving the cam plate 105 to the right, the reverse actuation of the valves 80, 81 and the valve 52 will be successively effected to release the brake as smoothly as it was previously applied. It will be clear that by a rapid actuation of the valve plate to the left from its original position shown in Figure 9, a maximum or "emergency" application of the brake can be smoothly and powerfully effected by the closing of the valves, and the rotor hydraulically locked against rotation.

I claim:

1. Hydraulic braking mechanism comprising: a stator; an annular rotor receiving the stator and co-acting therewith to define therebetween an annular working chamber containing a liquid; vanes mounted in the rotor for movement radially, and yieldingly urged into the working chamber for circulation of the liquid in the latter by the vanes, when the rotor is rotating; a valve mounted in the stator for movement from a non-operating position to an operating position in the working chamber, so as to oppose the circulation of liquid in the latter by the vanes; said valve having cam surfaces extending circumferentially of the stator and on which said vanes ride past the valve; the stator having a bypass through which a restricted circulation of the liquid in the working chamber can be effected around the valve when in an operating position, so as to produce a braking action upon the rotor; and means by which the valve can be moved to operating and non-operating positions.

2. Hydraulic mechanism comprising: a stator, an annular rotor receiving the stator and co-acting therewith to define therebetween an annular working chamber containing a liquid; vanes mounted in the rotor for movement radially, and yieldingly urged into the working chamber for circulation of the liquid in the latter by the vanes, when the rotor is rotating; a valve mounted in the stator for movement from a non-operating position to an operating position in the working chamber, so as to oppose the circulation of liquid in the latter by the vanes; said valve having cam surfaces extending circumferentially of the stator and on which said vanes ride past the valve; the stator having a bypass through which a restricted circulation of the liquid in the working chamber can be effected around the valve when in an operating position, so as to produce a braking action upon the rotor; means by which the valve can be moved to operating and non-operating positions; means by which the circulation of liquid through said bypass can be varied to increase the braking action upon the rotor to the maximum of a hydraulic lock thereupon; and means by which the last means can be actuated.

3. Hydraulic braking mechanism comprising: a stator; an annular rotor receiving the stator and co-acting therewith to define therebetween an annular working chamber containing a liquid; vanes mounted in the rotor for movement radially, and yieldingly urged into the working chamber for circulation of the liquid in the latter by the vanes when the rotor is rotating; a valve mounted in the stator for movement from a non-operating position to an operating position in the working chamber, so as to oppose the circulation of liquid in the latter by the vanes; said valve having wings projecting from opposite sides thereof circumferentially of the rotor and defining cam surfaces on which said vanes ride past the valve when in an operating position; the stator having a bypass with ports opening into the working chamber at opposite sides of the valve, through which a restricted circulation of the liquid in the working chamber can be effected by the vanes when the valve is in an operating position, so as to produce a braking action upon the rotor; valve means controlling said bypass; and means for actuating the valve and valve means in successive order to first move the valve from non-operating position to operating position, and then move the valve means from open to closed position with respect to the bypass.

4. Hydraulic braking mechanism comprising: a stator; an annular rotor receiving the stator and co-acting therewith to define therebetween an annular working chamber containing a liquid; vanes mounted in the rotor for movement radially, and yieldingly urged into the working chamber for circulation of liquid in the latter by the vanes when the rotor is rotating; a valve mounted in the stator for movement from a non-operating position to an operating position in the working chamber, so as to oppose the circulation of liquid in the latter by the vanes; means carried by the rotor, co-acting with the vanes to move the latter clear of the valve when in an operating position, so as to enable the vanes to pass the valve; the stator having a bypass around the valve, through which a restricted circulation of the liquid in the working chamber can be effected when the valve occupies an operating position, so as to produce a braking action upon the rotor; valve means controlling the bypass; and means operatively connecting said valve and valve means, by which they can be actuated in successive order.

5. Hydraulic braking mechanism comprising: a stator; an annular rotor receiving the stator and co-acting therewith to define therebetween an annular working chamber containing a liquid; vanes mounted in the rotor for movement radially, and yieldingly urged into the working chamber for circulation of liquid in the latter by the vanes when the rotor is rotating; a valve mounted in the stator for movement from a non-operating position to an operating position in the working chamber, so as to oppose the circulation of liquid in the latter by the vanes; means carried by the rotor, co-acting with the vanes to move the latter clear of the valve when in an operating position, so as to enable the vanes to pass the valve; the stator having a bypass around the valve, through which a restricted circulation of the liquid in the working chamber can be effected when the valve occupies an operating position, so as to produce a braking action upon the rotor; valve means controlling the bypass; hydraulic master cylinder and piston actuating units for said valve and valve means, respectively; means operatively connecting the piston of one unit to the valve; means operatively connecting the piston of another unit to said valve means; and means for actuating the pistons of said units in such timed relationship as to effect movement of the valve from non-operating position to operating position and the valve means from open to closed position in successive order.

6. Hydraulic braking mechanism comprising: a stator; an annular rotor receiving the stator and co-acting therewith to define therebetween an annular working chamber containing a liquid; vanes mounted in the rotor for movement radially, and yieldingly urged into the working chamber for circulation of the liquid in the latter by the vanes when the rotor is rotating; the stator having a circumferentially extending slot opening into the working chamber, and a transverse slot intersecting the first said slot and also opening into the working chamber; a valve reciprocably mounted in said transverse slot to occupy a non-operating position in the latter and operating positions in the working chamber; wings projecting from opposite sides of said valve and working in the first said slot; said wings having cam surfaces extending from the outer end of said valve to a point of tangency with the periphery of the stator when the valve occupies its extreme operating position, for co-action with the vanes in moving the latter clear of the valve, so that the vanes can pass the valve; and means for actuating the valve.

7. Hydraulic braking mechanism comprising: a stator; an annular rotor receiving the stator and co-acting therewith to define therebetween an annular working chamber containing a liquid; vanes mounted in the rotor for movement radially, and yieldingly urged into the working chamber for circulation of the liquid in the latter by the vanes when the rotor is rotating; the stator having a circumferentially extending slot opening into the working chamber, and a transverse slot intersecting the first said slot and also opening into the working chamber; a valve reciprocably mounted in said transverse slot to occupy a non-operating position in the latter and operating positions in the working chamber; wings projecting from opposite sides of said valve and working in the first said slot; said wings having cam surfaces extending from the outer end of said valve to a point of tangency with the periphery of the stator when the valve occupies its extreme operating position, for co-action with the vanes in moving the latter clear of the valve, so that the vanes can pass the valve; the stator having a generally U-shaped bypass whose branches provide ports opening into the working chamber at opposite sides of the valve to provide for a restricted circulation of liquid around the valve when in operating positions; means for actuating the valve; valve means for controlling the flow of liquid through the by-pass; and means operatively connecting the last two means in a predetermined timed relationship.

8. Hydraulic braking mechanism comprising: a stator; an annular rotor receiving the stator and co-acting therewith to define therebetween an annular working chamber containing a liquid; vanes mounted in the rotor for movement radially, and yieldingly urged into the working chamber for circulation of the liquid in the latter by the vanes when the rotor is rotating; the stator having a circumferentially extending slot opening into the working chamber, and a transverse slot intersecting the first said slot and also opening into the working chamber; a valve reciprocably mounted in said transverse slot to occupy a non-operating position in the latter, and operating positions in the working chamber; wings projecting from opposite sides of said valve and working in the first said slot; said wings having cam surfaces extending from the outer end of said valve to a point of tangency with the periphery of the stator when the valve occupies its extreme operating position, for co-action with the vanes in moving the latter clear of the valve, so that the vanes can pass the valve; the stator having a generally U-shaped by-pass whose branches provide ports opening into the working chamber at opposite sides of the valve to provide for a restricted circulation of liquid around the valve when in operating positions; valves for controlling the flow of liquid through said by-pass; hydraulic cylinder and piston actuating units carried by the stator; means operatively connecting the piston of one unit to said valve; means operatively connecting the piston of another unit to said by-pass valves; and means operatively connecting the pistons of said units for actuation of said valve and by-pass valves in successive order.

9. Hydraulic braking mechanism comprising: a stator; a rotor co-acting with the stator to define therebetween an annular working chamber containing a liquid; vanes movably mounted in the rotor and yieldingly urged into the working chamber for circulation of liquid therein by the vanes when the rotor is rotating; a valve mounted for movement from a non-operating position to an operating position in the working chamber so as to oppose circulation of liquid therein by the vanes; means for moving the vanes clear of the valve when in operating position so as to enable the vanes to pass the valve; means defining a by-pass through which restricted circulation of liquid in the working chamber may be effected past the valve when in an operating position, so as to produce a braking action upon the rotor; and means for actuating the valve.

10. Hydraulic braking mechanism comprising: a stator; a rotor co-acting with the stator to define therebetween an annular working chamber containing a liquid; vanes movably mounted in the rotor and yieldingly urged into the working chamber for circulation of liquid therein by the vanes when the rotor is rotating; a valve mounted for movement from a non-operating position to an operating position in the working chamber so as to oppose circulation of liquid therein by the vanes; means for moving the vanes clear of the valve when in operating position so as to enable the vanes to pass the valve; means defining a by-pass through which restricted circulation of liquid in the working chamber may be effected past the valve when in operating position, so as to produce a braking action upon the rotor; valve means controlling said by-pass; and means for actuating said valve and valve means successively.

RALPH E. CORNWELL.

REFERENCES CITED

The following references are of record in the file of this patent:

UNITED STATES PATENTS

| Number | Name | Date |
|---|---|---|
| 1,149,970 | Taft | Aug. 10, 1915 |
| 1,559,462 | Ryan | Oct. 27, 1925 |
| 1,896,103 | Shantz | Feb. 7, 1933 |
| 1,932,334 | Conger et al. | Oct. 24, 1933 |
| 1,939,605 | Dempsey | Dec. 12, 1933 |
| 1,967,749 | Ferguson et al. | July 24, 1934 |